(12) United States Patent
Thompson (10) Patent No.: US 12,082,518 B2
(45) Date of Patent: Sep. 10, 2024

(54) LOCATION-BASED CONTROL SYSTEM FOR AN AGRICULTURAL IMPLEMENT

(71) Applicant: CNH Industrial Canada, Ltd., Saskatoon (CA)

(72) Inventor: Dennis George Thompson, Eagle Ridge (CA)

(73) Assignee: CNH Industrial Canada, Ltd. (CA)

( * ) Notice: Subject to any disclaimer, the term of this patent is extended or adjusted under 35 U.S.C. 154(b) by 706 days.

(21) Appl. No.: 17/202,436

(22) Filed: Mar. 16, 2021

(65) Prior Publication Data

US 2022/0295690 A1 Sep. 22, 2022

(51) Int. Cl.
  *A01C 7/20* (2006.01)
  *A01B 63/00* (2006.01)
  *A01B 79/00* (2006.01)

(52) U.S. Cl.
  CPC ............ *A01C 7/203* (2013.01); *A01B 63/002* (2013.01); *A01B 79/005* (2013.01)

(58) Field of Classification Search
  CPC ........ A01C 7/203; A01B 3/002; A01B 79/005
  See application file for complete search history.

(56) References Cited

U.S. PATENT DOCUMENTS

| | | | |
|---|---|---|---|
| 6,003,455 A | 12/1999 | Flamme et al. | |
| 7,938,074 B2 | 5/2011 | Liu | |
| 8,234,988 B2 | 8/2012 | Zielke et al. | |
| 8,307,771 B2 | 11/2012 | Cannon et al. | |
| 8,380,356 B1 | 2/2013 | Zielke et al. | |
| 8,942,894 B2 | 1/2015 | Garner et al. | |
| 9,173,339 B2 | 11/2015 | Sauder et al. | |
| 9,237,687 B2 | 1/2016 | Sauder et al. | |
| 9,609,803 B2 | 4/2017 | Gervais et al. | |
| 9,629,306 B2 | 4/2017 | Sauder et al. | |
| 9,955,625 B2 | 5/2018 | Bauer et al. | |
| 10,051,784 B2 | 8/2018 | Kowalchuk | |
| 10,091,926 B2 | 10/2018 | Maro | |
| 10,168,714 B2 | 1/2019 | Webber et al. | |
| 2006/0200294 A1 | 9/2006 | Scheufler et al. | |
| 2018/0128933 A1* | 5/2018 | Koch et al. | ............ A01C 7/203 |
| 2019/0072114 A1 | 3/2019 | Myers et al. | |

* cited by examiner

*Primary Examiner* — Tara Mayo
(74) *Attorney, Agent, or Firm* — Rebecca Henkel; Peter K. Zacharias; Rickard K. DeMille (57) ABSTRACT

A control system for multiple row units of an agricultural implement includes a controller configured to selectively enable automatic downforce control for at least one controllable ground-engaging tool of each row unit that is within a work zone of an agricultural field. The automatic downforce control for the at least one controllable ground-engaging tool includes controlling a downforce of the at least one controllable ground-engaging tool such that the downforce is within a threshold range of a respective target downforce. In addition, the controller is configured to selectively disable the automatic downforce control for the at least one controllable ground-engaging tool of each row unit that is within a no-work zone of the agricultural field, or selectively adjust the respective target downforce for the at least one controllable ground-engaging tool of each row unit that is within the no-work zone of the agricultural field.

20 Claims, 4 Drawing Sheets

LOCATION-BASED CONTROL SYSTEM FOR AN AGRICULTURAL IMPLEMENT

BACKGROUND

The present disclosure relates generally to a location-based control system for an agricultural implement.

Certain agricultural implements (e.g., seeders, planters, etc.) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground-engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds/other agricultural products. Certain row units may also include residue management wheel(s) positioned in front of the opener and configured to break up and/or displace residue on the soil surface.

Certain planting implements include a control system configured to control a penetration depth of the opener(s) of each row unit into the soil, thereby controlling the depth of the seeding path (e.g., trench) formed by the opener(s). For example, the opener(s) may include opener disc(s), and the control system may control a vertical position of adjacent gauge wheel(s) to control the penetration depth of the opener disc(s). Furthermore, in certain embodiments, the control system may control a downforce applied by the closing discs to the soil, a downforce applied by the packer wheel to the soil, a downforce applied by the residue management wheel(s) to the soil, or a combination thereof, during operation of the planting implement, thereby establishing a desired soil profile behind the planted seeds/other agricultural products.

BRIEF DESCRIPTION

In certain embodiments, a control system for multiple row units of an agricultural implement includes a controller having a memory and a processor. The controller is configured to determine whether each row unit is within a work zone of an agricultural field or within a no-work zone of the agricultural field. The controller is also configured to selectively enable automatic downforce control for at least one controllable ground-engaging tool of each row unit that is within the work zone of the agricultural field. The automatic downforce control for the at least one controllable ground-engaging tool includes controlling a first downforce of the at least one controllable ground-engaging tool independently of a second downforce applied by a non-controllable ground-engaging tool of the row unit such that the first downforce is within a threshold range of a respective target downforce. In addition, the controller is configured to selectively disable the automatic downforce control for the at least one controllable ground-engaging tool of each row unit that is within the no-work zone of the agricultural field, or selectively adjust the respective target downforce for the at least one controllable ground-engaging tool of each row unit that is within the no-work zone of the agricultural field.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
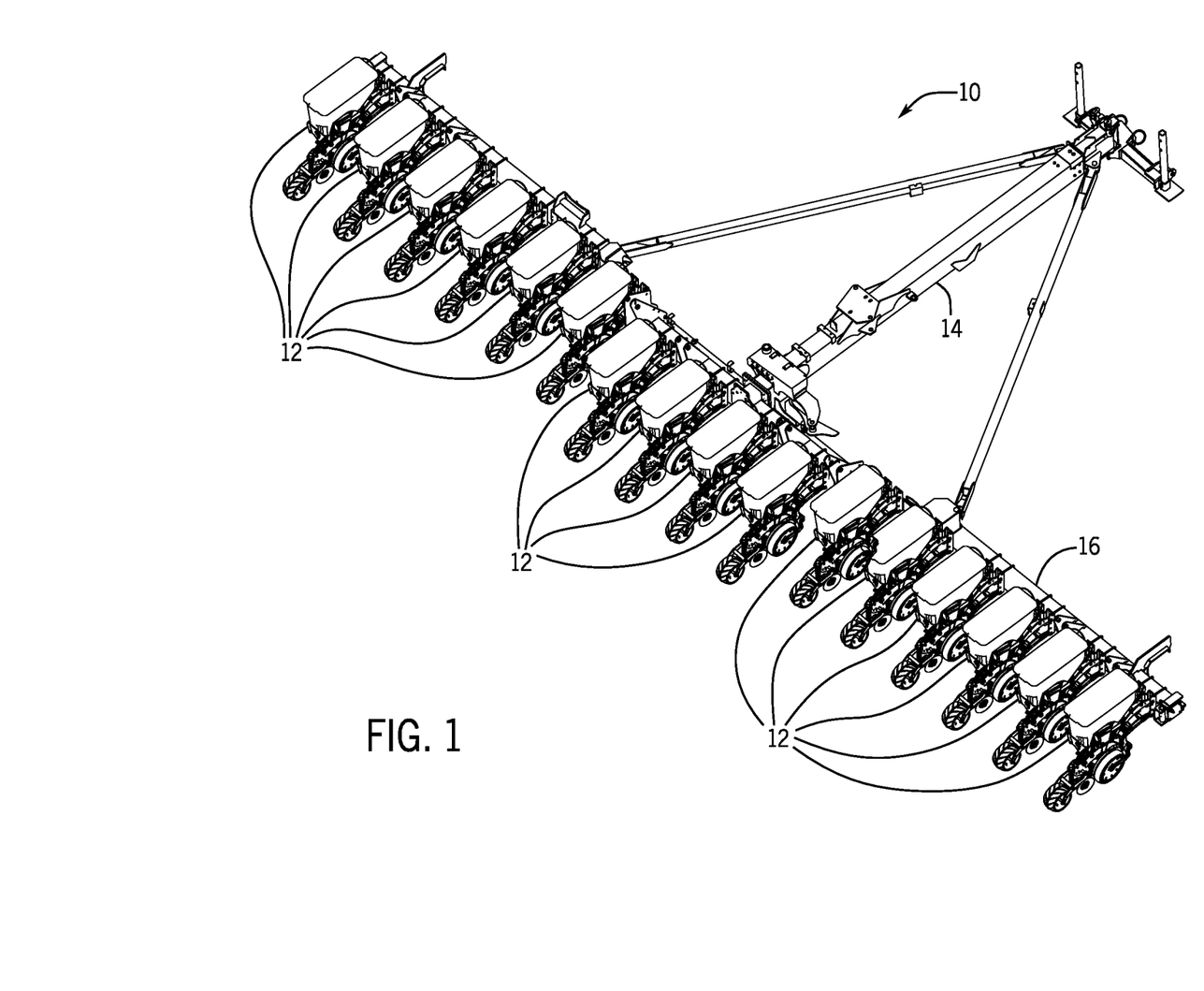
FIG. 1 is a perspective view of an embodiment of an agricultural implement having multiple row units distributed across a width of the agricultural implement.

FIG. 1 is a perspective view of an embodiment of an agricultural implement 10 (e.g., planting implement, planter) having multiple row units 12 (e.g., planter row units) distributed across a width of the agricultural implement 10. The agricultural implement 10 is configured to be towed through an agricultural field behind a work vehicle, such as a tractor. As illustrated, the agricultural implement 10 includes a tongue assembly 14, which includes a hitch configured to couple the agricultural implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s).

In certain embodiments, the agricultural implement 10 includes a control system for the row units 12. The control system includes a controller configured to determine whether each row unit is within a work zone of the agricultural field or within a no-work zone of the agricultural field. The controller is also configured to selectively enable automatic downforce control for one or more controllable ground-engaging tools of each row unit that is within the work zone of the agricultural field. The one or more controllable ground-engaging tools (e.g., downforce controllable ground-engaging tools) may include the closing disc(s), the packer wheel, residue management wheel(s), or a combination thereof. In addition, the work zone may include a portion of the agricultural field in which agricultural operations (e.g., planting operations) have not previously been performed and in which agricultural operations are desired. The automatic downforce control for the controllable ground-engaging tool(s) includes controlling a first downforce of each controllable ground-engaging tool independently of a second downforce applied by a non-controllable ground-engaging tool (e.g., gauge wheel(s)) such that the first downforce is within a threshold range of a respective target downforce. In addition, the controller is configured to selectively disable the automatic downforce control for the controllable ground-engaging tool(s) of each row unit that is within the no-work zone of the agricultural field. Additionally or alternatively, the controller is configured to selectively adjust the respective target downforce of the controllable ground-engaging tool(s) of each row unit that is within the no-work zone of the agricultural field. The no-work zone may include a portion of the agricultural field in which agricultural operations (e.g., planting operations) have previously been performed and/or a portion of the agricultural field in which agricultural operations (e.g., planting operations) are not to be performed (e.g., in which agricultural operations are not desired). Disabling automatic downforce control or adjusting (e.g., reducing) the respective target downforce(s) for the controllable ground-engaging tool(s) of each row unit that is within the no-work zone may substantially reduce soil disturbance and/or reduce the draft load on the work vehicle. In addition, disabling automatic downforce control for the controllable ground-engaging tool(s) of each row unit that is within the no-work zone may reduce power consumption (e.g., electrical power consumption, hydraulic power consumption, pneumatic power consumption, etc.), thereby increasing the efficiency of the agricultural operation (e.g., planting operation).

Additionally or alternatively, the controller of the control system is configured to determine whether each penetration depth controllable ground-engaging tool is within the work zone of the agricultural field or within the no-work zone of the agricultural field. The controller is also configured to selectively enable automatic penetration depth control for each penetration depth controllable ground-engaging tool that is within the work zone. With regard to penetration depth control for the planter row units, the controllable ground-engaging tools (e.g., penetration depth controllable ground-engaging tools) may include the opener disc(s). The automatic penetration depth control for each controllable ground-engaging tool includes controlling a penetration depth of the controllable ground-engaging tool such that the penetration depth is within a threshold range of a respective target penetration depth. For example, in the illustrated embodiment, the automatic penetration depth control for each opener disc includes controlling a position of a respective gauge wheel relative to the opener disc to control the penetration depth of the opener disc. In addition, the controller is configured to selectively disable the automatic penetration depth control for each controllable ground-engaging tool that is within the no-work zone of the agricultural field without extracting the controllable ground-engaging tool from the soil. Alternatively, the controller is configured to set the respective target penetration depth for each controllable ground-engaging tool that is within the no-work zone of the agricultural field to a minimum penetration depth (e.g., in which the minimum penetration depth is greater than 0 cm below a surface of the soil). Setting the respective target penetration depth to the minimum penetration depth for each controllable ground-engaging tool that is within the no-work zone may substantially reduce soil disturbance and/or reduce the draft load on the work vehicle. In addition, disabling the automatic penetration depth control for each controllable ground-engaging tool that is within the no-work zone may reduce power consumption (e.g., electrical power consumption, hydraulic power consumption, pneumatic power consumption, etc.), thereby increasing the efficiency of the agricultural operation (e.g., planting operation).

Figure 2:
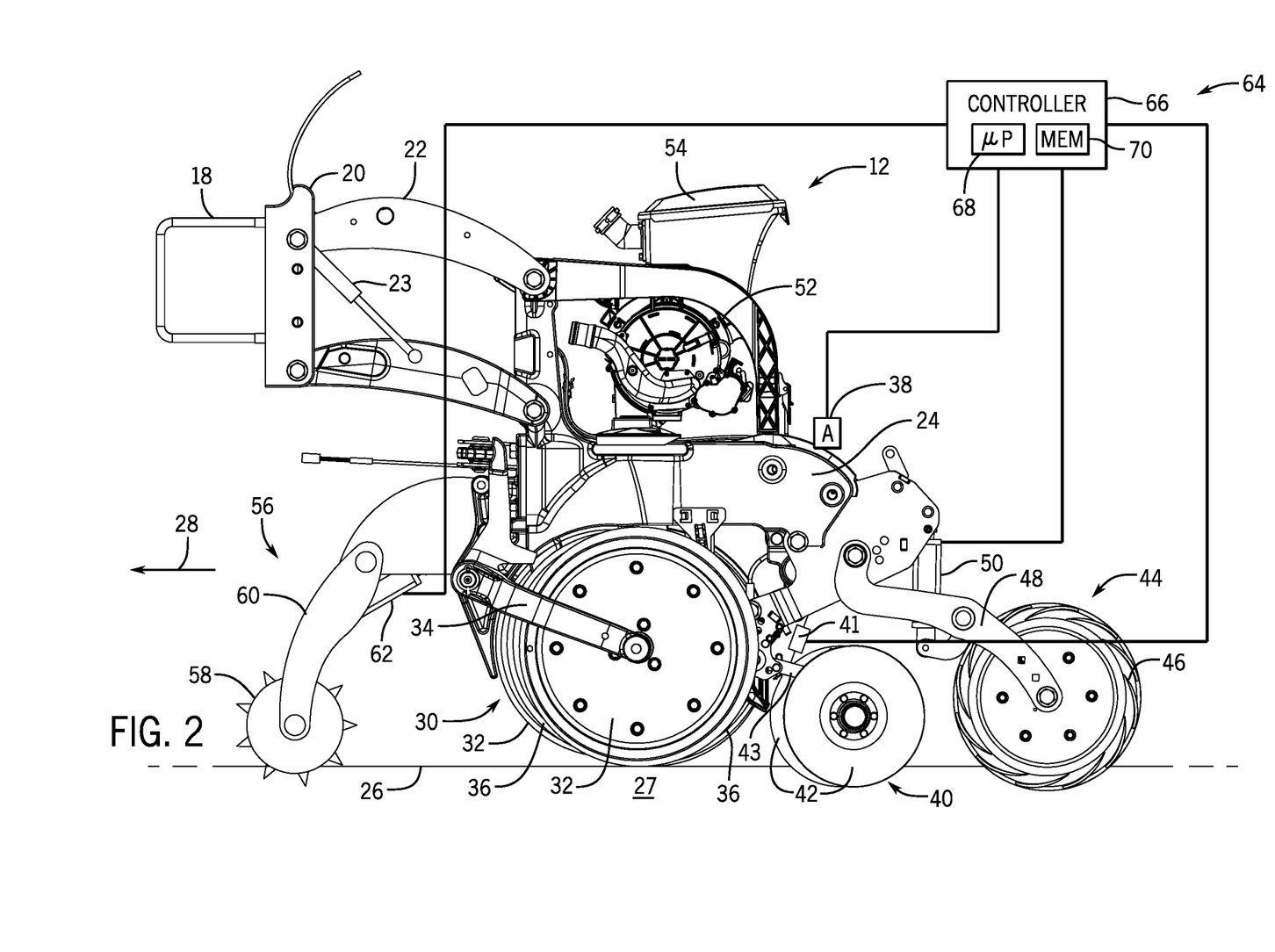
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a surface 26 of the soil 27. In the illustrated embodiment, a down pressure cylinder 23 is coupled to the linkage assembly 22 and configured to urge the frame 24 toward the soil surface 26. While the row unit 12 includes a down pressure cylinder 23 in the illustrated embodiment, in other embodiments, the row unit may include any other suitable down pressure device (e.g., alone or in combination with the down pressure cylinder), such as a pneumatic cylinder, a spring, another suitable down pressure device, or a combination thereof, configured to urge the frame toward the soil surface. Furthermore, while the illustrated linkage assembly 22 is a parallel linkage assembly (e.g., a four-bar linkage assembly), in other embodiments, another suitable linkage assembly may extend between the bracket and the frame.

The row unit 12 is configured to deposit seeds and/or other agricultural product(s) at a target depth beneath the soil surface 26 as the row unit 12 traverses a field along a direction of travel 28. The row unit 12 includes an opener assembly 30 that forms a trench in the soil 27 for seed/other agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil 27, and the gauge wheels 32 are configured to control a penetration depth of the opener discs 36 into the soil. In the illustrated embodiment, the row unit 12 includes a depth control actuator 38 configured to control the vertical position of the gauge wheels 32 (e.g., by blocking rotation of the arms in the upward direction beyond a selected orientation), thereby controlling the penetration depth of the opener discs 36 into the soil. The depth control actuator 38 may include any suitable type(s) of actuator(s) (e.g., hydraulic actuator(s), pneumatic actuator(s), electromechanical actuator(s), etc.), and the depth control actuator 38 may control the vertical position of the gauge wheels 32 via any suitable mechanical linkage (e.g., a linkage configured to block rotation of the arms 34 in the upward direction beyond a selected orientation that is controlled by the depth control actuator 38). While the illustrated opener assembly 30 includes two gauge wheels 32 and two opener discs 36 in the illustrated embodiment, in other embodiments, the opener assembly may include more or fewer gauge wheels (e.g., 0, 1, 3, or more) and/or more or fewer opener discs (e.g., 0, 1, 3, or more). For example, in certain embodiments, the gauge wheels may be omitted, and other suitable device(s) (e.g., skid(s), ski(s), etc.) may be used to control the penetration depth of the opener disc(s) into the soil. Furthermore, in certain embodiments, the opener discs may be omitted, and other suitable opener(s) (e.g., shank(s), knife/knives, etc.) may be used to form the trench within the soil.

The row unit 12 also includes an agricultural product conveying system (e.g., seed tube or powered agricultural product conveyor) configured to deposit seeds and/or other agricultural product(s) (e.g., fertilizer) into the trench. The opener assembly 30 and the agricultural product conveying system are followed by a closing assembly 40 that moves displaced soil back into the trench. In the illustrated embodiment, the closing assembly 40 includes two closing discs 42. However, in other embodiments, the closing assembly may include other suitable closing device(s) (e.g., a single closing disc, etc.). In the illustrated embodiment, the closing assembly 40 includes an actuator 41 extending between the frame 24 of the row unit 12 and an arm 43 of the closing assembly 40. As illustrated, the arm 43 is pivotally coupled to the frame 24, and the actuator 41 is configured to control a downforce applied by the closing disc(s) 42 to the soil 27. The actuator 41 may include any suitable type(s) of actuator(s) (e.g., hydraulic actuator(s), pneumatic actuator(s), electromechanical actuator(s), etc.). Furthermore, while the actuator 41 extends to the arm 43 of the closing assembly 40 in the illustrated embodiment, in other embodiments, the actuator may extend to any suitable portion of the closing assembly (e.g., in embodiments in which the arm is omitted), such as the hub of the closing disc(s). In addition, in certain embodiments, the closing assembly, including the closing disc(s), the arm, and the actuator, may be omitted.

In the illustrated embodiment, the closing assembly 40 is followed by a packing assembly 44 configured to pack soil on top of the deposited seeds and/or other agricultural product(s). The packing assembly 44 includes a packer wheel 46, an arm 48 that pivotally couples the packer wheel 46 to the frame 24, and an actuator 50 configured to control a downforce applied by the packer wheel 46 to the soil surface 26, thereby enabling the packer wheel to pack soil on top of the deposited seeds and/or other agricultural product(s). As illustrated, the actuator 50 extends between the frame 24 of the row unit 12 and the arm 48 of the packing assembly 44. However, in other embodiments, the actuator may extend to any other suitable portion of the packer assembly, such as to a hub of the packer wheel. The actuator 50 may include any suitable type(s) of actuator(s) (e.g., hydraulic actuator(s), pneumatic actuator(s), electromechanical actuator(s), etc.). Furthermore, in certain embodiments, the packing assembly, including the packer wheel, the arm, and the actuator, may be omitted.

The row unit 12 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in other embodiments, other suitable seed/agricultural product meters may be utilized. As used herein, "vacuum" refers to an air pressure that is less than the ambient atmospheric air pressure, and not necessarily zero.

In the illustrated embodiment, the row unit 12 also includes a residue management assembly 56 having one or more residue management wheels 58. As illustrated, the residue management assembly 56 is positioned in front of the opener assembly 30 relative to the direction of travel 28, thereby enabling the residue management wheel(s) 58 to break up and/or displace residue on the surface 26 of the soil before the opener disc(s) 36 engage the soil 27. In the illustrated embodiment, the residue management wheel(s) 58 are rotatably coupled to an arm 60, and the arm 60 is pivotally coupled to the frame 24 of the row unit 12. In addition, the residue management assembly 56 includes an actuator 62 extending between the arm 60 and the frame 24 of the row unit 12. The actuator 60 is configured to control a downforce applied by the residue management wheel(s) 58 to the soil 27. While the actuator 62 extends between the frame 24 of the row unit 12 and the arm 60 of the residue management assembly 56 in the illustrated embodiment, in other embodiments, the actuator may extend to any other suitable portion of the residue management assembly, such as to a hub of the residue management wheel(s). The actuator 62 may include any suitable type(s) of actuator(s) (e.g., hydraulic actuator(s), pneumatic actuator(s), electromechanical actuator(s), etc.). Furthermore, in certain embodiments, the residue management assembly, including the residue management wheel(s), the arm, and the actuator, may be omitted.

In the illustrated embodiment, the agricultural implement (e.g., planting implement, planter) includes a control system 64 for the row units 12 of the agricultural implement. The control system 64 includes a controller 66 communicatively coupled to the closing disc downforce actuator 44, the packer wheel downforce actuator 50, and the residue management wheel downforce actuator 62. In certain embodiments, the controller 66 is an electronic controller having electrical circuitry configured to control the downforce actuators. In the illustrated embodiment, the controller 66 includes a processor, such as the illustrated microprocessor 68, and a memory device 70. The controller 66 may also include one or more storage devices and/or other suitable components. The processor 68 may be used to execute software, such as software for controlling the downforce actuators, and so forth. Moreover, the processor 68 may include multiple microprocessors, one or more "general-purpose" microprocessors, one or more special-purpose microprocessors, and/or one or more application specific integrated circuits (ASICs), or some combination thereof. For example, the processor 68 may include one or more reduced instruction set (RISC) processors.

The memory device 70 may include a volatile memory, such as random access memory (RAM), and/or a nonvolatile memory, such as read-only memory (ROM). The memory device 70 may store a variety of information and may be used for various purposes. For example, the memory device 70 may store processor-executable instructions (e.g., firmware or software) for the processor 68 to execute, such as instructions for controlling the downforce actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the downforce actuators, etc.), and any other suitable data.

In certain embodiments, the controller 66 is configured to determine whether each row unit of the agricultural implement is within a work zone of the agricultural field or within a no-work zone of the agricultural field. The controller is also configured to selectively enable automatic downforce control for one or more controllable ground-engaging tools of each row unit of the agricultural implement that is within the work zone of the agricultural field. In the present embodiment, the one or more controllable ground-engaging tools include downforce controllable ground-engaging tools, such as the closing disc(s) 42, the packer wheel 46, the residue management wheel(s) 58, or a combination thereof. As previously discussed, the work zone may include a portion of the agricultural field in which agricultural operations (e.g., planting operations) have not previously been performed and in which agricultural operations are desired. The automatic downforce control for the controllable ground-engaging tool(s) includes controlling a first downforce of each controllable ground-engaging tool independently of a second downforce applied by a non-controllable ground-engaging tool (e.g., gauge wheel(s)) such that the first downforce is within a threshold range of a respective target downforce. In addition, the controller 66 is configured to selectively disable the automatic downforce control for the controllable ground-engaging tool(s) of each row unit that is within the no-work zone of the agricultural field. Additionally or alternatively, the controller is configured to selectively adjust the respective target downforce(s) of the controllable ground-engaging tool(s) of each row unit that is within the no-work zone of the agricultural field. The no-work zone may include a portion of the agricultural field in which agricultural operations (e.g., planting operations) have previously been performed and/or a portion of the agricultural field in which agricultural operations are not to be performed (e.g., in which agricultural operations are not desired). Disabling automatic downforce control or adjusting (e.g., reducing) the respective target downforce for the controllable ground-engaging tool(s) of each row unit that is within the no-work zone may substantially reduce soil disturbance and/or reduce the draft load on the work vehicle.

By way of example, during operation of the agricultural implement (e.g., planter, planting implement), a first portion of the row units 12 may be positioned within a work zone (e.g., portion of the agricultural field in which agricultural operations are desired and have not previously been performed), and a second portion of the row units 12 may be positioned within a no-work zone (e.g., portion of the agricultural field in which agricultural operations have previously been performed and/or are not desired). With regard to the first portion of the row unit(s) 12 that are within the work zone, the controller 66 may selectively enable automatic downforce control for the closing disc(s) 42, the packer wheel 46, and the residue management wheel(s) 58. The automatic downforce control for the closing disc(s) 42 includes controlling the closing disc downforce actuator 41 to control the downforce of the closing disc(s) 42 independently of the downforce applied by the gauge wheel(s) 32 such that the downforce applied by the closing disc(s) is within a threshold range of a respective target downforce. In addition, the automatic downforce control for the packer wheel 46 includes controlling the packer wheel downforce actuator 50 to control the downforce of the packer wheel 46 independently of the downforce applied by the gauge wheel(s) 32 such that the downforce applied by the packer wheel 46 is within a threshold range of a respective target downforce. Furthermore, the automatic downforce control for the residue management wheel(s) 58 includes controlling the residue management downforce actuator 62 to control the downforce of the residue management wheel(s) 58 independently of the downforce applied by the gauge wheel(s) 32 such that the downforce applied by the residue management wheel(s) 58 is within a threshold range of a respective target downforce.

With regard to downforce control, the gauge wheel(s) 32 and the opener disc(s) 36 are non-controllable ground-engaging tool(s) because the row unit does not include an independent downforce actuator for the gauge wheel(s) 32/opener disc(s) 36. Instead, the downforce applied by the gauge wheel(s) and opener disc(s) is established/controlled by the down pressure cylinder 23, which is configured to urge the row unit frame toward the soil surface. As used herein with regard to downforce control for ground-engaging tools on a row unit, "a non-controllable ground-engaging tool" refers to a ground-engaging tool in which the downforce is not controllable independently of the downforce established by the row unit frame.

With regard to the second portion of the row unit(s) 12 that are within the no-work zone, the controller 66 may selectively disable automatic downforce control for the closing disc(s) 42, the packer wheel 46, and the residue management wheel(s) 58. Disabling automatic downforce control may include controlling the respective downforce actuator(s) to terminate application of force (e.g., downforce) to the respective controllable ground-engaging tool(s), thereby reducing soil disturbance caused by the controllable ground-engaging tools and/or reducing the draft load on the work vehicle. Additionally or alternatively, with regard to the second portion of the row unit(s) 12 that are within the no-work zone, the controller 66 may selectively adjust the respective target downforces for the closing disc(s) 42, the packer wheel 46, and the residue management wheel(s) 58. Adjusting the respective target downforce(s) may include reducing respective target downforce(s) and/or setting respective target downforce(s) to a negative value (e.g., to establish upward force(s)), thereby reducing soil disturbance caused by the controllable ground-engaging tools and/or reducing the draft load on the work vehicle. Once a row unit exits the no-work zone and enters the work zone, the controller 66 may selectively enable automatic downforce control for the controllable ground-engaging tool(s). In addition, if the respective target downforce(s) were adjusted, the controller 66 may reset the respective target downforce(s) to the initial value(s).

With regard to downforce control, in the present embodiment, the controllable ground-engaging tools of the row unit include the closing disc(s), the packer wheel, and the residue management wheel(s). However, in other embodiments, at least one row unit of the agricultural implement may include other and/or additional controllable ground-engaging tool(s), such as finishing disc(s) and/or coulter disc(s). Furthermore, with regard to downforce control, in the present embodiment, the non-controllable ground-engaging tools include the opener disc(s) and the gauge wheel(s). However, in other embodiments, at least one row unit of the agricultural implement may include other and/or additional non-controllable ground-engaging too(s), such as finishing disc(s) and/or coulter disc(s).

In certain embodiments, the controller 66 of the control system 64 is configured to selectively enable automatic penetration depth control for each depth controllable ground-engaging tool (e.g., of each row unit) that is within the work zone of the agricultural field. In the present embodiment, each row unit includes one or more depth controllable ground-engaging tools, such as the opener disc(s) 36. The automatic penetration depth control for each controllable ground-engaging tool (e.g., opener disc) includes controlling a penetration depth of the controllable ground-engaging tool such that the penetration depth is within a threshold range of a respective target penetration depth. For example, in the illustrated embodiment, the automatic penetration depth control for each opener disc 36 includes controlling a vertical position of a respective gauge wheel 32 relative to the opener disc 36 to control the penetration depth of the opener disc 36. In addition, the controller is configured to selectively disable the automatic penetration depth control for each controllable ground-engaging tool (e.g., of each row unit) that is within the no-work zone of the agricultural field without extracting the controllable ground-engaging tool from the soil. Additionally or alternatively, the controller is configured to set the respective target penetration depth for each controllable ground-engaging tool (e.g., of each row unit) that is within the no-work zone of the agricultural field to a minimum penetration depth, in which the minimum penetration depth is greater than 0 cm below a surface of the soil. Setting the respective target penetration depth to the minimum penetration depth for each controllable ground-engaging tool (e.g., of each row unit) that is within the no-work zone may substantially reduce soil disturbance and/or reduce the draft load on the work vehicle. In addition, disabling the automatic penetration depth control for each controllable ground-engaging tool (e.g., of each row unit) that is within the no-work zone may reduce power consumption (e.g., electrical power consumption, hydraulic power consumption, pneumatic power consumption, etc.), thereby increasing the efficiency of the agricultural operation (e.g., planting operation). Disabling automatic penetration depth control may also reduce the duration of raising the respective row unit from a working position to a raised position (e.g., at an end of field turn) and lowering the respective row unit back to the working position.

By way of example, during operation of the agricultural implement (e.g., planter, planting implement), a first portion of the row units 12 may be positioned within a work zone (e.g., portion of the agricultural field in which agricultural operations are desired and have not previously been performed), and a second portion of the row units 12 may be positioned within a no-work zone (e.g., portion of the agricultural field in which agricultural operations have previously been performed and/or are not desired). With regard to the first portion of the row unit(s) 12 that are within the work zone, the controller 66 may selectively enable automatic penetration depth control for the opener disc(s) 36. The automatic penetration depth control for the opener disc(s) 36 includes controlling the depth control actuator 38, which is communicatively coupled to the controller 66, to control the vertical position of each gauge wheel 32 relative to the respective opener disc 36 to control the penetration depth of the opener disc 36 such that the penetration depth is within a threshold range of a respective target penetration depth. With regard to the second portion of the row unit(s) 12 that are within the no-work zone, the controller 66 may selectively disable automatic penetration depth control for the opener disc(s) 36. Additionally or alternatively, with regard to the second portion of the row unit(s) 12 that are within the no-work zone, the controller 66 may set the respective target penetration depth for each opener disc 36 to a minimum penetration depth, in which the minimum penetration depth is greater than 0 cm below the surface of the soil.

While the depth controllable ground-engaging tools include opener disc(s) in the present embodiment, in other embodiments, at least one row unit may include other and/or additional depth controllable ground-engaging tool(s), such as finishing disc(s), coulter disc(s), knife/knives, shank(s), or a combination thereof. Furthermore, while enabling penetration depth control, disabling penetration depth control, and setting respective target penetration depths is disclosed above with regard to a planting implement/planter, the control system disclosed herein may be used for penetration depth control on other suitable agricultural implements, such as seeding implements/seeders and/or tillage implements. For example, in certain embodiments, a seeding implement/seeder may include multiple row units, and reach row unit may include an opener disc and a gauge wheel. In such embodiments, the controller of the control system disclosed herein may control the position of each gauge wheel while automatic penetration depth control is enabled, and the controller may selectively enable automatic penetration depth control for each opener disc (e.g., of each row unit) that is within the work zone. The controller may also selectively disable the automatic penetration depth control for each opener disc (e.g., of each row unit) that is within the no-work zone without extracting the opener disc from the soil, or the controller may set the respective target penetration depth for each opener disc (e.g., of each row unit) that is within the no-work zone to a minimum penetration depth, in which the minimum penetration depth is greater than 0 cm below the surface of the soil.

Figure 3:
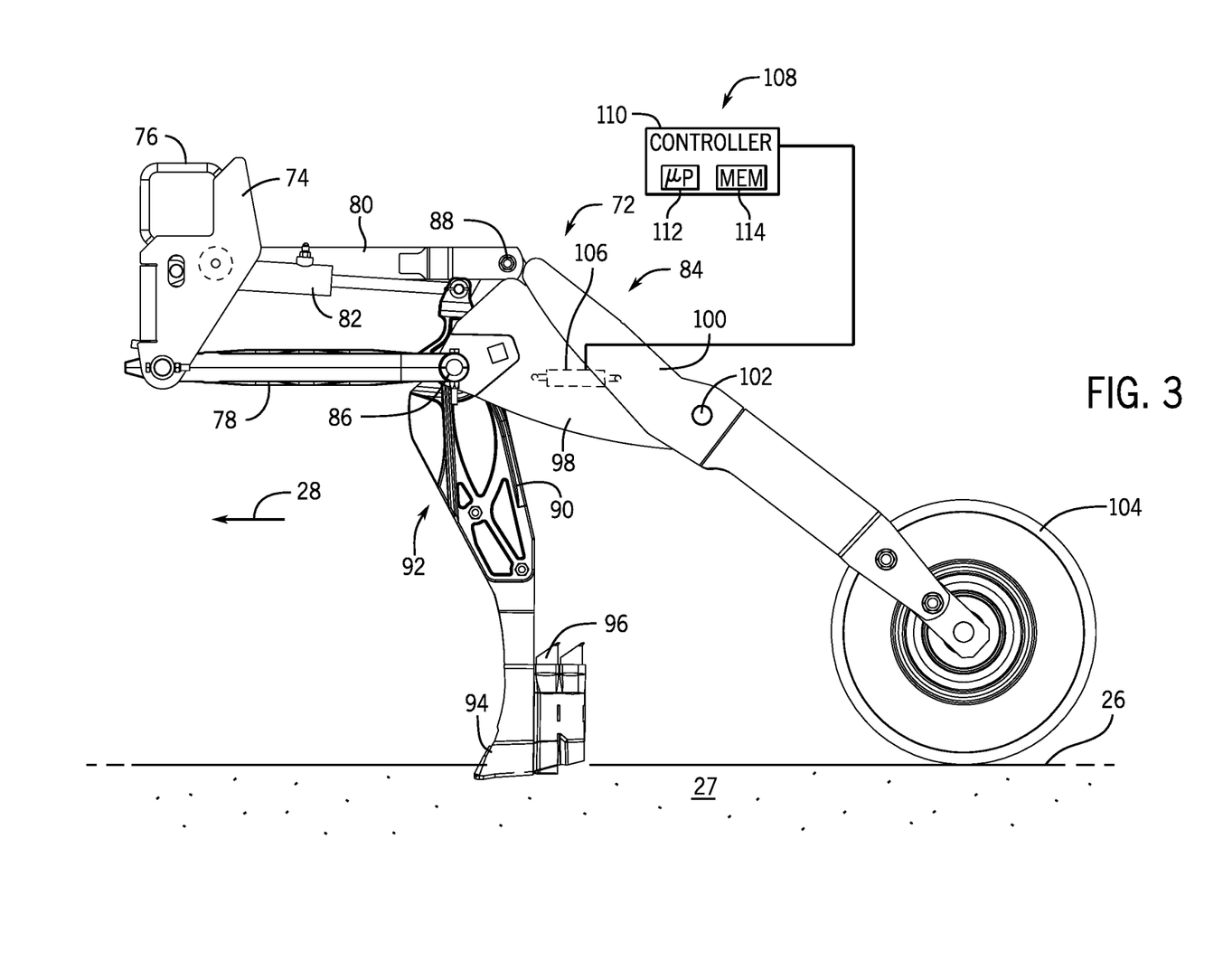
FIG. 3 is a side view of another embodiment of a row unit that may be employed within an agricultural implement.

FIG. 3 is a side view of another embodiment of a row unit 72 that may be employed within an agricultural implement, such as a seeding implement or seeder. As illustrated, the row unit 72 includes a frame support 74 and a mounting bracket 76. The frame support 74 and the mounting bracket 76 are configured to interface with a toolbar, thereby securing the row unit 72 to the agricultural implement frame. While the illustrated embodiment includes a single mounting bracket 76, in other embodiments, the row unit may include additional mounting brackets (e.g., 2, 3, 4, 5, 6, or more). Furthermore, while the illustrated row unit 72 is coupled to the toolbar by the frame support 74 and the mounting bracket(s) 76, in other embodiments, the row unit may be coupled to the toolbar by any other suitable connection system (e.g., fastener(s), a welded connection, an adhesive connection, etc.).

In addition, the row unit 72 includes a first linkage member 78, a second linkage member 80, and a biasing device, such as the illustrated downforce actuator 82 (e.g., hydraulic or pneumatic piston-cylinder assembly). As illustrated, the first linkage member 78 (e.g., first link) and the second linkage member 80 (e.g., second link) extend from the frame support 74 to a packer wheel arm 84. The first linkage member 78 is pivotally coupled to the frame support 74, thereby pivotally coupling the first linkage member 78 to the toolbar of the agricultural seeding implement. In addition, the first linkage member 78 is pivotally coupled to the packer wheel arm 84 at a first pivot joint 86. In the illustrated embodiment, the second linkage member 80 is pivotally coupled to the frame support 74, thereby pivotally coupling the second linkage member 80 to the toolbar of the agricultural seeding implement. Furthermore, the second linkage member 80 is pivotally coupled to the packer wheel arm 84 at a second pivot joint 88. Accordingly, the first and second linkage members form a linkage (e.g., parallel linkage) between the frame support 74 and the packer wheel arm 84. While the linkage is formed by the first and second linkage members in the illustrated embodiment, in other embodiments, the packer wheel arm may be coupled to the frame support by any other suitable type of linkage (e.g., a linkage including only the first linkage member, a linkage including only the second linkage member, etc.).

The downforce actuator 82 is pivotally coupled to the frame support 74 and to a shank 90 of an opener 92. In addition, the shank 90 is pivotally coupled to the first linkage member 78 and to the packer wheel arm 84 at the first pivot joint 86. A blade 94 of the opener 92 is rigidly coupled (e.g., non-movably coupled, non-rotatably coupled, non-translatably coupled, etc.) to the shank 90 and configured to engage the soil 27. Applying pressurized fluid (e.g., hydraulic fluid, air, etc.) to the downforce actuator 82 urges the packer wheel arm 84 and the opener 92 to translate downwardly. Translational movement of the packer wheel arm 84 and the opener 92 is controlled by the linkage. For example, the linkage may cause the packer wheel arm 84 and the opener 92 to translate along a vertical axis. While the illustrated embodiment utilizes a downforce actuator 82 as the biasing member, in alternative embodiments, the row unit may include another suitable type of biasing member, such as a spring or a pneumatic strut, for example.

The blade 94 is configured to form a trench within the soil 27 as the row unit 72 moves along the direction of travel 28. In the illustrated embodiment, the row unit 72 includes an agricultural product tube 96 (e.g., seed tube) configured to direct agricultural product into the trench formed by the blade 94. In the illustrated embodiment, the row unit 72 includes two agricultural product tubes 96 configured to deposit two agricultural products (e.g., two different agricultural products) into the soil. However, in other embodiments, the row unit may include more or fewer agricultural product tubes (e.g., 1, 3, 4, or more).

In the illustrated embodiment, the packer wheel arm 84 includes a first portion 98 and a second portion 100 pivotally coupled to one another at a third pivot joint 102. The first portion 98 is pivotally coupled to the first linkage member 78 and to the second linkage member 80, and a packer wheel 104 is rotatably coupled to the second portion 100 of the packer wheel arm 84. The packer wheel 104 rotates along the soil surface 26 to both pack the soil on top of deposited agricultural product and to control the penetration depth of the blade 94. In the illustrated embodiment, the row unit 72 includes a packer wheel actuator 106 coupled to the first portion 98 and to the second portion 100 of the packer wheel arm 84. The packer wheel actuator 106 is configured to control a position of the packer wheel 104 relative to the opener 92 to control the penetration depth of the blade 94 within the soil 27. For example, the packer wheel actuator 106 may drive the second portion 100 of the packer wheel arm 84 to rotate upwardly relative to the first portion 98 of the packer wheel arm 84, thereby moving the packer wheel 104 upwardly relative to the opener 92. As a result, the penetration depth of the blade 94 may increase. In addition, the packer wheel actuator 106 may drive the second portion 100 of the packer wheel arm 84 to rotate downwardly relative to the first portion 98 of the packer wheel arm 84, thereby moving the packer wheel 104 downwardly relative to the opener 92. As a result, the penetration depth of the blade 94 may decrease. While the packer wheel actuator 106 is positioned proximate to the linkage members in the illustrated embodiment, in other embodiments, the packer wheel actuator may be positioned proximate to the packer wheel or at another suitable location along the packer wheel arm.

In the illustrated embodiment, the agricultural implement (e.g., seeding implement, seeder) includes a control system 108 for the row units 72/ground-engaging tools of the implement. The control system 108 includes a controller 110 communicatively coupled to the packer wheel actuator 106. In certain embodiments, the controller 110 is an electronic controller having electrical circuitry configured to control the packer wheel actuator. In the illustrated embodiment, the controller 110 includes a processor, such as the illustrated microprocessor 112, and a memory device 114. The controller 110 may also include one or more storage devices and/or other suitable components. The processor 112 may be used to execute software, such as software for controlling the packer wheel actuator 106 to control the penetration depth of the blade 94 of the opener 92, and so forth. Moreover, the processor 112 may include multiple microprocessors, one or more "general-purpose" microprocessors, one or more special-purpose microprocessors, and/or one or more application specific integrated circuits (ASICs), or some combination thereof. For example, the processor 112 may include one or more reduced instruction set (RISC) processors.

The memory device 114 may include a volatile memory, such as random access memory (RAM), and/or a nonvolatile memory, such as read-only memory (ROM). The memory device 114 may store a variety of information and may be used for various purposes. For example, the memory device 114 may store processor-executable instructions (e.g., firmware or software) for the processor 112 to execute, such as instructions for controlling the packer wheel actuator 106, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the packer wheel actuator 106, etc.), and any other suitable data.

In the illustrated embodiment, the controller 110 of the control system 108 is configured to determine whether each controllable ground-engaging tool (e.g., depth controllable ground-engaging tool) is within the work zone of the agricultural field or within the no-work zone of the agricultural field. The controller 110 is also configured to selectively enable automatic penetration depth control for each controllable ground-engaging tool (e.g., depth controllable ground-engaging tool) that is within the work zone of the agricultural field. In the illustrated embodiment, the controllable ground-engaging tool (e.g., depth controllable ground-engaging tool) of each row unit 72 includes the opener 92. As previously discussed, the work zone may include a portion of the agricultural field in which agricultural operations (e.g., seeding operations) have not previously been performed and in which agricultural operations are desired. The automatic penetration depth control for each controllable ground-engaging tool (e.g., each opener 92) includes controlling a penetration depth of the controllable ground-engaging tool such that the penetration depth is within a threshold range of a respective target penetration depth. For example, in the illustrated embodiment, the automatic penetration depth control for the opener 92 of each row unit 72 includes controlling a vertical position of a respective packer wheel 104 relative to the opener 92 to control the penetration depth of the blade 94 of the opener 92 within the soil 27. In addition, the controller 110 is configured to selectively disable the automatic penetration depth control for each controllable ground-engaging tool that is within the no-work zone of the agricultural field without extracting the controllable ground-engaging tool from the soil. Additionally or alternatively, the controller is configured to set the respective target penetration depth for each controllable ground-engaging tool that is within the no-work zone of the agricultural field to a minimum penetration depth, in which the minimum penetration depth is greater than 0 cm below the surface of the soil. As previously discussed, the no-work zone may include a portion of the agricultural field in which agricultural operations have previously been performed and/or a portion of the agricultural field in which agricultural operations are not to be performed (e.g., in which agricultural operations are not desired). Setting the respective target penetration depth to the minimum penetration depth for each controllable ground-engaging tool that is within the no-work zone may substantially reduce soil disturbance and/or reduce the draft load on the work vehicle. In addition, disabling the automatic penetration depth control for each controllable ground-engaging tool that is within the no-work zone may reduce power consumption (e.g., electrical power consumption, hydraulic power consumption, pneumatic power consumption, etc.), thereby increasing the efficiency of the agricultural operation (e.g., seeding operation).

By way of example, during operation of the agricultural implement (e.g., seeder, seeding implement), a first portion of the row units 72 may be positioned within a work zone (e.g., portion of the agricultural field in which agricultural operations are desired and have not previously been performed), and a second portion of the row units 72 may be positioned within a no-work zone (e.g., portion of the agricultural field in which agricultural operations have previously been performed and/or are not desired). With regard to the first portion of the row unit(s) 72/opener(s) 92 that are within the work zone, the controller 110 may selectively enable automatic penetration depth control for the opener(s) 92. The automatic penetration depth control for each opener 92 includes controlling the respective packer wheel actuator 106 to control the vertical position of the respective packer wheel 104 relative to the opener 92 to control the penetration depth of the blade 94 of the opener 92 such that the penetration depth is within a threshold range of a respective target penetration depth. With regard to the second portion of the row unit(s) 72/opener(s) 92 that are within the no-work zone, the controller 110 may selectively disable automatic penetration depth control for the opener(s) 92. Additionally or alternatively, with regard to the second portion of the row unit(s) 72/opener(s) 92 that are within the no-work zone, the controller 110 may set the respective target penetration depth for each opener 92 to a minimum penetration depth, in which the minimum penetration depth is greater than 0 cm below the surface 26 of the soil 27. While the controllable ground-engaging tools include openers in the illustrated embodiment, in other embodiments, at least one row unit may include other and/or additional type(s) of controllable ground-engaging tool(s) (e.g., depth controllable ground-engaging tool(s)), such as opener disc(s) and/or coulter disc(s). As used herein with regard to penetration depth control, "controllable ground-engaging tool" refers to a ground-engaging tool in which the penetration depth of the ground-engaging tool is controllable.

As previously discussed with regard to penetration depth control of the planter/planting row units of FIG. 2 and the seeder/seeding row units of FIG. 3, the controller is configured to selectively disable automatic penetration depth control and/or set the respective target penetration depth to the minimum penetration depth for each depth controllable ground-engaging tool that is within the no-work zone. In certain embodiments, the controller may set the respective target penetration depth for each depth controllable ground-engaging tool that is within the no-work zone to the minimum penetration depth. The controller may then selectively disable automatic penetration depth control for each depth controllable ground-engaging tool that is within the no-work zone without extracting the depth controllable ground-engaging tool from the soil in response to the penetration depth of the depth controllable ground-engaging tool being within the threshold range of the respective target penetration depth.

Furthermore, in the illustrated embodiment, each row unit 72 includes a downforce actuator 82 configured to urge the packer wheel arm 84 and the opener 92 to translate downwardly. Accordingly, the downforce actuator 82 may control the force (e.g., including downforce) applied by the opener 92 to the soil 27 and the downforce applied by the packer wheel 104 to the soil 27. In certain embodiments, the controller 110 may be communicatively coupled to the downforce actuator 82 to automatically control the force (e.g., downforce) applied by the opener 92 and the packer wheel 104. In such embodiments, the controller 110 may determine whether each opener 92/packer wheel 104 is within the work zone of the agricultural field or within the no-work zone of the agricultural field. The controller 110 may also selectively enable automatic force (e.g., downforce) control for each opener 92/packer wheel 104 (e.g., of each row unit 72) that is within the work zone of the agricultural field. The automatic force control for the opener/packer wheel may include controlling the downforce actuator 82 to control the force applied by one controllable ground-engaging tool (e.g., the opener or the packer wheel) such that the force (e.g., downforce) is within a threshold range of a respective target force (e.g., downforce). In addition, the controller 110 may selectively disable the automatic force control (e.g., including termination of application of force) for each opener 92/packer wheel 104 (e.g., of each row unit 72) that is within the no-work zone of the agricultural field. Additionally or alternatively, the controller 110 may selectively adjust the respective target force for each opener 92/packer wheel 104 (e.g., of each row unit 72) that is within the no-work zone of the agricultural field. Adjusting the respective target force(s) may include reducing respective target force(s) and/or setting the respective target force(s) to a negative value (e.g., to establish upward force(s) without causing the controllable ground-engaging tool(s) to disengage the soil). Disabling automatic force control and/or adjusting the respective target downforce for each opener/packer wheel (e.g., of each row unit) that is within the no-work zone may substantially reduce soil disturbance and/or reduce the draft load on the work vehicle.

In certain embodiments, at least one row unit may include a residue management assembly having a set of one or more residue management wheels. The residue management assembly may be positioned in front of the opener relative to the direction of travel, thereby enabling the residue management wheel(s) to break up and/or displace residue on the surface of the soil before the opener engages the soil. The residue management wheel(s) may be rotatably coupled to an arm, and the arm may be pivotally coupled to the frame support and/or to the toolbar. In addition, the residue management assembly may include an actuator extending between the arm and the frame support/toolbar. The actuator may control the downforce applied by the residue management wheel(s) to the soil. Furthermore, the controller may be communicatively coupled to the actuator to automatically control the downforce applied by the residue management wheel(s) to the soil. The controller may determine whether each set of residue management wheel(s) is within the work zone of the agricultural field or within the no-work zone of the agricultural field. The controller may also selectively enable automatic downforce control for each set of residue management wheel(s) (e.g., of each row unit) that is within the work zone of the agricultural field. The automatic downforce control for the residue management wheel(s) may include controlling the actuator to control the downforce applied by the residue management wheel(s) such that the downforce is within a threshold range of a respective target downforce. In addition, the controller may selectively disable the automatic downforce control (e.g., including termination of application of downforce) for each set of residue management wheel(s) (e.g., of each row unit) that is within the no-work zone of the agricultural field. Additionally or alternatively, the controller may selectively adjust the respective target downforce for each set of residue management wheel(s) (e.g., of each row unit) that is within the no-work zone of the agricultural field. Adjusting the respective target downforce may include reducing the respective target downforce and/or setting the respective target downforce to a negative value (e.g., to establish an upward force without causing the residue management wheel(s) to disengage the soil). Disabling automatic downforce control and/or adjusting the respective target downforce for each set of residue management wheel(s) (e.g., of each row unit) that is within the no-work zone may substantially reduce soil disturbance and/or reduce the draft load on the work vehicle.

Figure 4:
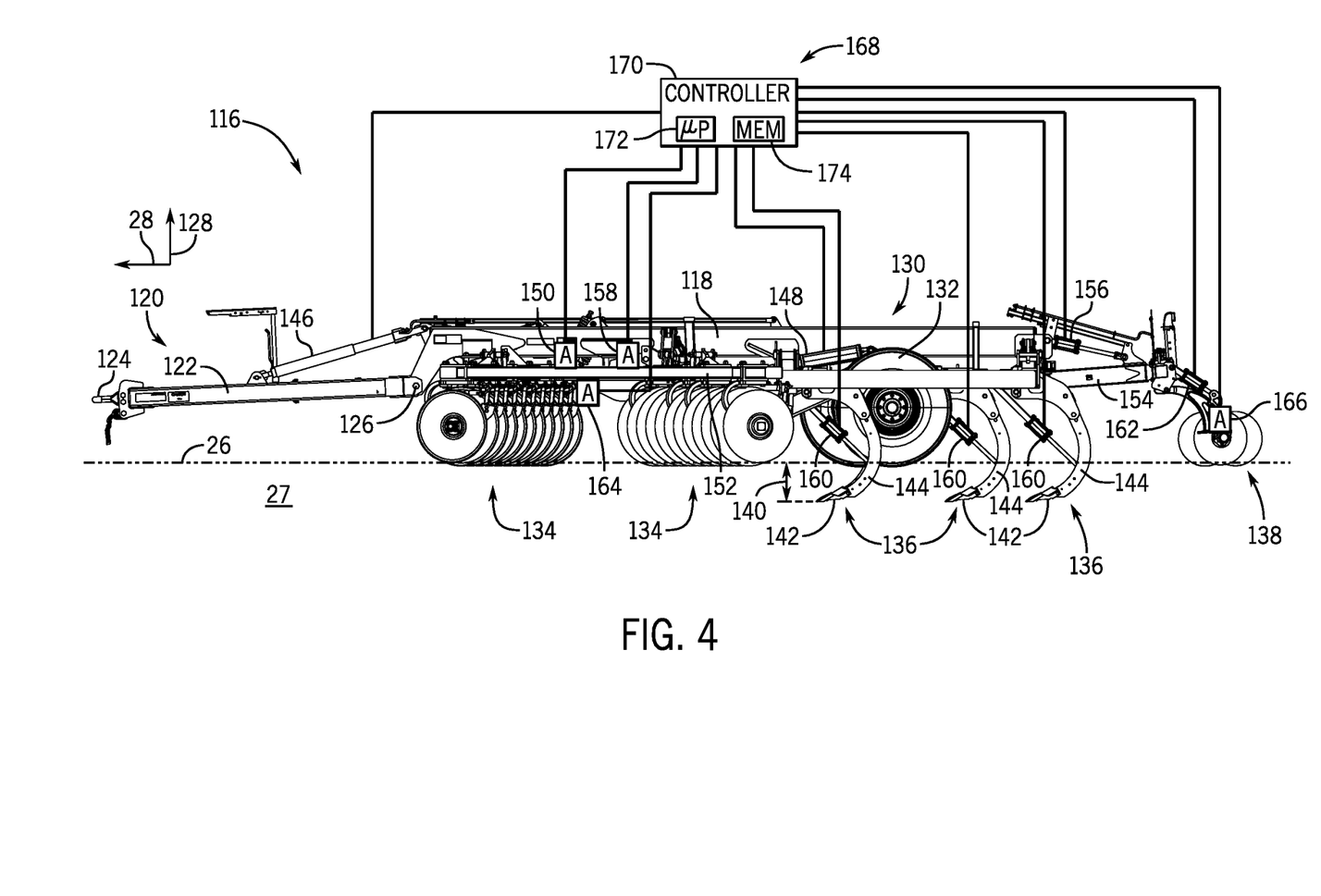
FIG. 4 is a side view of an embodiment of a tillage implement having multiple controllable ground-engaging tools.

FIG. 4 is a side view of an embodiment of a tillage implement 116 having multiple controllable ground-engaging tools. In the illustrated embodiment, the tillage implement 116 is a primary tillage implement having multiple ground-engaging tools configured to till soil. As illustrated, the tillage implement 116 includes a frame 118 and a hitch assembly 120 coupled to the frame 118. The frame 118 may be substantially rigid and may be formed from multiple frame elements (e.g., rails, tubes, braces, etc.) coupled to one another (e.g., via welded connection(s), via fastener(s), etc.). The hitch assembly 120 includes a hitch frame 122 and a hitch 124. The hitch frame 122 is pivotally coupled to the implement frame 118 via pivot joint(s) 126, and the hitch 124 is configured to couple to a corresponding hitch of a work vehicle (e.g., tractor), which is configured to tow the tillage implement 116 through the agricultural field along the direction of travel 28. While the hitch frame 122 is pivotally coupled to the implement frame 118 in the illustrated embodiment, in other embodiments, the hitch frame may be movably coupled to the implement frame by a linkage assembly (e.g., four bar linkage assembly, etc.) or another suitable assembly/mechanism that enables the hitch to move along a vertical axis 128 relative to the implement frame.

As illustrated, the tillage implement 116 includes wheel assemblies 130 movably coupled to the implement frame 118. In the illustrated embodiment, each wheel assembly 130 includes a wheel frame and one or more wheels 132 rotatably coupled to the wheel frame. The wheels 132 of the wheel assemblies 130 are configured to engage the surface 26 of the soil 27, and the wheel assemblies 130 are configured to support at least a portion of the weight of the tillage implement 116. In the illustrated embodiment, each wheel frame is pivotally coupled to the implement frame 118, thereby facilitating adjustment of the position of each wheel 132 along the vertical axis 128. However, in other embodiments, at least one wheel frame may be movably coupled to the implement frame by another suitable connection (e.g., sliding connection, linkage assembly, etc.) that facilitates adjustment of the vertical position of the respective wheel(s).

In the illustrated embodiment, the tillage implement 116 includes controllable ground-engaging tools, such as the illustrated disc blades 134, tillage point assemblies 136, and finishing discs 138. The disc blades 134 are configured to engage a top layer of the soil 27. As the tillage implement 116 is towed through the field, the disc blades 134 are driven to rotate, thereby breaking up the top layer. In the illustrated embodiment, the disc blades 134 are arranged in two rows. However, in alternative embodiments, the disc blades may be arranged in more or fewer rows (e.g., 1, 3, 4, 5, 6, or more). In addition, the angle of each row relative to the direction of travel 28 may be controlled to control the interaction of the disc blades 134 with the top layer of soil 27. The tillage point assemblies 136 are configured to engage the soil 27 at a greater depth 140, thereby breaking up a lower layer of the soil. Each tillage point assembly 136 includes a tillage point 142 and a shank 144. The shank 144 is configured to position the tillage point 142 at the depth 140 beneath the soil surface 26, and the tillage point 142 is configured to break up the soil. The shape of each tillage point 142, the arrangement of the tillage point assemblies 136, and the number of tillage point assemblies 136 may be selected to control tillage within the field. Furthermore, as the tillage implement 116 is towed through the field, the finishing discs 138 are driven to rotate, thereby sizing soil clods, leveling the soil surface, smoothing the soil surface, cutting residue on the soil surface, or a combination thereof.

While the illustrated tillage implement 116 includes the disc blades 134, the tillage point assemblies 136, and the finishing discs 138, in other embodiments, the tillage implement may include other and/or additional controllable ground-engaging tool(s). For example, the disc blades, the tillage point assemblies, the finishing discs, or a combination thereof, may be omitted in certain embodiments. Furthermore, in certain embodiments, the tillage implement may include one or more other suitable type(s) controllable ground-engaging tool(s), such as finishing reel(s), coulter(s), opener(s), and tine(s), among other suitable controllable ground-engaging tools. Furthermore, while the tillage implement 116 is a primary tillage implement in the illustrated embodiment, in other embodiments, the tillage implement may be a vertical tillage implement or another suitable type of tillage implement.

In the illustrated embodiment, the disc blades 134, the tillage point assemblies 136, and the finishing discs 138 are controllable ground-engaging tools. As used herein with regard to the tillage implement, "controllable ground-engaging tool" refers to a ground-engaging tool in which one or more parameters of the ground-engaging tool (e.g., an angle of the ground-engaging tool relative to the direction of travel of the tillage implement, a penetration depth of the ground-engaging tool, a force applied by the ground-engaging tool to the soil, or a combination thereof) may be controlled (e.g., by one or more actuators) relative to another ground-engaging tool of the same type (e.g., disc blade, tillage point assembly, finishing disc, etc.). In the illustrated embodiment, the tillage implement 116 includes a first depth control actuator 146 coupled to the implement frame 118 and to the hitch frame 122 of the hitch assembly 120. The first depth control actuator 146 is configured to control a position of the hitch 124 of the hitch assembly 120 relative to the implement frame 118 along the vertical axis 128. While the first depth control actuator 146 is coupled to the hitch frame 122 in the illustrated embodiment, in other embodiments, the first depth control actuator may be coupled directly to the hitch or another suitable element of the hitch assembly. In addition, the tillage implement 116 includes one or more second depth control actuators 148 coupled to the implement frame 118 and to the wheel frame(s) of the wheel assembly/assemblies 130. For example, in certain embodiment, one second depth control actuator 148 may be coupled to each respective wheel assembly 130. The first and second depth control actuators may control the height of the implement frame 118 above the surface 26 of the soil 27, thereby controlling the penetration depth of the disc blades 134 and the tillage point assemblies 136. Furthermore, in certain embodiments, the tillage implement 116 includes one or more third depth control actuators 150 coupled to the implement frame 118 and to disc blade frame(s) 152. For example, one third depth control actuator 150 may be coupled to each disc blade frame 152. The third depth control actuator(s) 150 are configured to control the height of each disc blade frame 152 relative to the surface 27 of the soil 27, thereby controlling the penetration depth of the respective disc blades 134.

In the illustrated embodiment, the finishing discs 138 are rotatably coupled to one or more finishing disc frames 154, and the finishing disc frame(s) 154 are pivotally coupled to the implement frame 118. In addition, one or more fourth depth control actuators 156 extend between the implement frame 118 and the finishing disc frame(s) 154. For example, one fourth depth control actuator 156 may be coupled to each finishing disc frame 154. Each fourth depth control actuator 156 is configured to control a penetration depth of the respective finishing disc(s) 138 into the soil 27. While each finishing disc frame 154 is pivotally coupled to the implement frame 118 in the illustrated embodiment, in other embodiments, at least one finishing disc frame may be movable coupled to the implement frame by a linkage assembly (e.g., four bar linkage assembly, etc.) or another suitable assembly/mechanism that enables the finishing disc frame to move vertically relative to the implement frame. Furthermore, in certain embodiments, at least one finishing disc frame may be non-translatably and/or non-rotatably coupled to the implement frame, or the finishing disc frames may be omitted, and the finishing discs may be coupled to the implement frame.

In certain embodiments, the tillage implement 116 may include one or more actuators configured to control a force applied by certain controllable ground-engaging tool(s) to the soil 27. For example, the tillage implement 116 may include one or more first force control actuators 158 coupled to the implement frame 118 and to the disc blade frame(s) 152 (e.g., instead of the third depth control actuator(s) 150). For example, one first force control actuator 158 may be coupled to each respective disc blade frame 152. The first force control actuator(s) 158 are configured to control the force (e.g., downforce) applied by the disc blades 134 to the soil 27. In addition, the tillage implement 116 may include one or more second force control actuators 160 coupled to the implement frame 118 and to shank(s) 144 of respective tillage point assembly/assemblies 136. For example, one second force control actuator 160 may be coupled to the shank 144 of each respective tillage point assembly 136. Each second force control actuator 160 is configured to control the force applied by a respective tillage point assembly 136 to the soil 27. The agricultural implement 116 may also include one or more third force control actuators 162 configured to control the force applied by the finishing disc(s) 138 to the soil 27.

Furthermore, in certain embodiments, the tillage implement 116 may include one or more orientation actuators configured to control an angle of certain controllable ground-engaging tool(s) relative to the direction of travel 28 of the tillage implement 116. For example, the tillage implement 116 may include one or more first orientation control actuators 164 configured to control the angle of one or more disc blades 134 relative to the direction of travel 28 of the tillage implement 116. At least one first orientation control actuator 164 may be configured to control an angle of a respective row of disc blades 134 relative to the direction of travel 28, at least one first orientation control actuator 164 may be configured to control an angle of a respective individual disc blade 134 relative to the direction of travel, at least one first orientation control actuator 164 may be configured to control an angle of a respective group of disc blades 134 (e.g., gang of disc blades, left/right portion of at least one row of disc blades, etc.) relative to the direction of travel, at least one first orientation control actuator 164 may be configured to control an angle of a respective disc blade frame 152 relative to the direction of travel 28, or a combination thereof. In addition, the tillage implement 116 may include one or more second orientation control actuators 166 configured to control an angle of the finishing disc(s) 138 relative to the direction of travel 28. For example, at least one second orientation control actuator 166 may control an angle of a respective individual finishing disc 138 relative to the direction of travel 28, at least one second orientation control actuator 166 may control an angle of a group of respective finishing discs 138 relative to the direction of travel 28, at least one second orientation control actuator 166 may control an angle of a respective finishing disc frame 154 relative to the direction of travel 28, or a combination thereof.

The depth control actuators, the force control actuators, and the orientation control actuators may include any suitable type(s) of actuator(s) (e.g., hydraulic cylinder(s), pneumatic cylinder(s), electromechanical actuator(s), other suitable type(s) of actuator(s), or a combination thereof). Furthermore, while particular actuators are disclosed above for controlling certain parameters of certain controllable ground-engaging tools, in certain embodiments, the agricultural implement may include other suitable actuator(s) configured to control one or more parameters of one or more controllable ground-engaging tools. For example, the penetration depth of at least one controllable ground-engaging tool may be independently controlled by a respective depth control actuator, the force (e.g., downforce) applied to the soil by at least one controllable ground-engaging tool may be independently controlled by a respective force control actuator, the angle of at least one controllable ground-engaging tool may be independently controlled by a respective orientation control actuator, or a combination thereof. Furthermore, in certain embodiments, one or more of the actuators disclosed above may be omitted. Accordingly, in certain embodiments, at least one of the ground-engaging tools that is disclosed above as being controllable may be non-controllable (e.g., at least with respect to certain parameter(s)). With regard to each actuator disclosed herein (e.g., with regard to the embodiments of FIGS. 2-4), an actuator being communicatively coupled to the controller refers to a communication link between the controller and the actuator that enables the controller to control the actuator. The communication link may include electrical conductor(s), electrical circuit(s), fluid conduit(s), valve assembly/assemblies, other suitable connection element(s), or a combination thereof.

In the illustrated embodiment, the tillage implement 116 includes a control system 168 for the controllable ground-engaging tools of the tillage implement 116. The control system 168 includes a controller 170 communicatively coupled to the first depth control actuator 146, to the second depth control actuator(s) 148, to the third depth control actuator(s) 150, to the fourth depth control actuator(s) 156, to the first force control actuator(s) 158, to the second force control actuator(s) 160, to the third force control actuator(s) 162, to the first orientation control actuator(s) 164, and to the second orientation control actuator(s) 166. In certain embodiments, the controller 170 is an electronic controller having electrical circuitry configured to control the depth control actuators, the force control actuators, and the orientation control actuators. In the illustrated embodiment, the controller 170 includes a processor, such as the illustrated microprocessor 172, and a memory device 174. The controller 170 may also include one or more storage devices and/or other suitable components. The processor 172 may be used to execute software, such as software for controlling the depth control actuators, the force control actuators, and the orientation control actuators, and so forth. Moreover, the processor 172 may include multiple microprocessors, one or more "general-purpose" microprocessors, one or more special-purpose microprocessors, and/or one or more application specific integrated circuits (ASICs), or some combination thereof. For example, the processor 172 may include one or more reduced instruction set (RISC) processors.

The memory device 174 may include a volatile memory, such as random access memory (RAM), and/or a nonvolatile memory, such as read-only memory (ROM). The memory device 174 may store a variety of information and may be used for various purposes. For example, the memory device 174 may store processor-executable instructions (e.g., firmware or software) for the processor 172 to execute, such as instructions for controlling the depth control actuators, the force control actuators, and the orientation control actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the depth control actuators, the force control actuators, and the orientation control actuators, etc.), and any other suitable data.

In certain embodiments, the controller 170 is configured to determine whether each controllable ground-engaging tool is within the work zone of the agricultural field or within the no-work zone of the agricultural field. The controller 170 is also configured to selectively enable automatic control of one or more parameters (e.g., angle relative to the direction of travel, penetration depth, force applied to the soil, etc.) of each controllable ground-engaging tool that is within the work zone of the agricultural field. As previously discussed, the work zone may include a portion of the agricultural field in which agricultural operations (e.g., tillage operations) have not previously been performed and in which agricultural operations (e.g., tillage operations) are desired. The automatic control of the one or more parameters of the controllable ground-engaging tool includes controlling the one or more parameters such that each of the one or more parameters is within a respective range of a target parameter. In addition, the controller 170 is configured to selectively disable automatic control of at least one of the one or more parameters of each controllable ground-engaging tool that is within the no-work zone of the agricultural field. Additionally or alternatively, the controller 170 is configured to selectively adjust at least one of the one or more parameters of each controllable ground-engaging tool that is within the no-work zone (e.g., before disabling automatic control of the at least one of the one or more parameters). As previously discussed, the no-work zone may include a portion of the agricultural field in which agricultural operations (e.g., tillage operations) have previously been performed and/or a portion of the agricultural field in which agricultural operations are not to be performed (e.g., in which agricultural operations are not desired).

By way of example, during operation of the tillage implement, a first portion of the depth controllable ground-engaging tools may be positioned within a work zone (e.g., portion of the agricultural field in which tillage operations are desired and have not previously been performed), and a second portion of the depth controllable ground-engaging tools may be positioned within a no-work zone (e.g., portion of the agricultural field in which tillage operations have previously been performed and/or are not desired). For example, the depth controllable ground-engaging tools of the left side of the tillage implement may be positioned within the work zone, and the depth controllable ground-engaging tools on the right side of the tillage implement may be positioned within the no-work zone. With regard to the first portion of the depth controllable ground-engaging tool(s) that are within the work zone, the controller 170 may selectively enable automatic penetration depth control for the disc blade(s) 134, the tillage point assembly/assemblies 136, and the finishing disc(s) 138. For example, the automatic penetration depth control for the disc blade(s) 134 may include controlling at least one of the third depth control actuators 150 to move respective disc blade frame(s) 152 relative to the implement frame 118 such that the penetration depth of the disc blade(s) is within the threshold range of the respective target penetration depth. In addition, the automatic penetration depth control for the finishing disc(s) 138 may include controlling at least one of the fourth depth control actuators 156 to move respective finishing disc frame(s) relative to the implement frame 118 such that the penetration depth of the finishing disc(s) is within the threshold range of the respective target penetration depth. Furthermore, in certain embodiments, the automatic penetration depth control for the tillage point assembly/assemblies may include controlling at least one depth control actuator coupled to a respective tillage point frame to move the respective tillage point frame relative to the implement frame such that the penetration depth of the tillage point assembly/assemblies coupled to the respective tillage point frame is within a threshold range of a respective target penetration depth (e.g., in embodiments in which at least one tillage point assembly is coupled to at least one vertically movable tillage point frame).

With regard to the second portion of the depth controllable ground-engaging tool(s) that are within the no-work zone, the controller 170 may selectively disable automatic penetration depth control for the disc blade(s) 134, the tillage point assembly/assemblies 136, and the finishing disc(s) 138. Disabling automatic penetration depth control for each depth controllable ground-engaging tool that is within the no-work zone may reduce power consumption (e.g., electrical power consumption, hydraulic power consumption, pneumatic power consumption, etc.), thereby increasing the efficiency of the agricultural operation (e.g., tillage operation). Additionally or alternatively, with regard to the second portion of the depth controllable ground-engaging tool(s) that are within the no-work zone, the controller 170 may selectively adjust the respective target penetration depth of each depth controllable ground-engaging tool that is within the no-work zone (e.g., before disabling automatic penetration depth control). For example, in certain embodiments, the controller may set the respective target penetration depth of each depth controllable ground-engaging tool to a minimum penetration depth in which the minimum penetration depth is greater than 0 cm below the soil surface. Setting the respective target penetration depth to the minimum penetration depth for each depth controllable ground-engaging tool that is within the no-work zone may substantially reduce soil disturbance and/or reduce the draft load on the work vehicle. Once a depth controllable ground-engaging tool exits the no-work zone and enters the work zone, the controller 170 may selectively enable automatic penetration depth control for the depth controllable ground-engaging tool. In addition, if the respective target penetration depth was adjusted, the controller 170 may reset the respective target penetration depth to the initial value.

Furthermore, by way of example, during operation of the tillage implement, a first portion of the force controllable ground-engaging tools may be positioned within a work zone (e.g., portion of the agricultural field in which tillage operations are desired and have not previously been performed), and a second portion of the force controllable ground-engaging tools may be positioned within a no-work zone (e.g., portion of the agricultural field in which tillage operations have previously been performed and/or are not desired). For example, the force controllable ground-engaging tools of the left side of the tillage implement may be positioned within the work zone, and the force controllable ground-engaging tools on the right side of the tillage implement may be positioned within the no-work zone. With regard to the first portion of the force controllable ground-engaging tool(s) that are within the work zone, the controller 170 may selectively enable automatic force control for the disc blade(s) 134, the tillage point assembly/assemblies 136, and the finishing disc(s) 138. For example, the automatic force control for the disc blade(s) 134 may include controlling at least one of the first force control actuators 158 to control the force (e.g., downforce) applied by the disc blade(s) to the soil 27 such that the force is within a threshold range of a target force. In addition, the automatic force control for the tillage point assembly/assemblies 136 may include controlling at least one of the second force control actuators 160 to control the force applied by the tillage point assembly/assemblies to the soil 27 such that the force is within a threshold range of a target force. Furthermore, the automatic force control for the finishing disc(s) 138 may include controlling at least one of the third force control actuators 162 to control the force applied by the finishing disc(s) to the soil 27 such that the force is within a threshold range of a target force.

With regard to the second portion of the force controllable ground-engaging tool(s) that are within the no-work zone, the controller 170 may selectively disable automatic force control for the disc blade(s) 134, the tillage point assembly/assemblies 136, and the finishing disc(s) 138. Disabling automatic force control for each force controllable ground-engaging tool that is within the no-work zone may include controlling the respective force control actuator(s) to terminate application of force to the respective force controllable ground-engaging tool(s), thereby reducing soil disturbance caused by the force controllable ground-engaging tool(s) and/or reducing the draft load on the work vehicle. Additionally or alternatively, with regard to the second portion of the force controllable ground-engaging tool(s) that are within the no-work zone, the controller 170 may selectively adjust the respective target force of each force controllable ground-engaging tool that is within the no-work zone (e.g., before disabling automatic force control). Adjusting the respective target force(s) may include reducing each respective target force and/or setting each respective target force to a negative value (e.g., to establish an upward force), thereby reducing soil disturbance caused by the force controllable ground-engaging tool(s) and/or reducing the draft load on the work vehicle. Once a force controllable ground-engaging tool exits the no-work zone and enters the work zone, the controller 170 may selectively enable automatic force control for the force controllable ground-engaging tool. In addition, if the respective target force was adjusted, the controller 170 may reset the respective target force to the initial value.

In addition, by way of example, during operation of the tillage implement, a first portion of the orientation controllable ground-engaging tools may be positioned within a work zone (e.g., portion of the agricultural field in which tillage operations are desired and have not previously been performed), and a second portion of the orientation controllable ground-engaging tools may be positioned within a no-work zone (e.g., portion of the agricultural field in which tillage operations have previously been performed and/or are not desired). For example, the orientation controllable ground-engaging tools of the left side of the tillage implement may be positioned within the work zone, and the orientation controllable ground-engaging tools on the right side of the tillage implement may be positioned within the no-work zone. With regard to the first portion of the orientation controllable ground-engaging tool(s) that are within the work zone, the controller 170 may selectively enable automatic orientation control for the disc blade(s) 134 and the finishing disc(s) 138. For example, the automatic orientation control for the disc blade(s) 134 may include controlling at least one of the first orientation control actuators 164 to control the angle of the disc blade(s) relative to the direction of travel 28 such that the angle is within a threshold range of a target angle. Furthermore, the automatic orientation control for the finishing disc(s) 138 may include controlling at least one of the second orientation control actuators 166 to control the angle of the finishing disc(s) relative to the direction of travel 28 such that the angle is within a threshold range of a target angle.

With regard to the second portion of the orientation controllable ground-engaging tool(s) that are within the no-work zone, the controller 170 may selectively disable automatic orientation control for the disc blade(s) 134 and the finishing disc(s) 138. Disabling automatic orientation control for each orientation controllable ground-engaging tool that is within the no-work zone may reduce power consumption (e.g., electrical power consumption, hydraulic power consumption, pneumatic power consumption, etc.), thereby increasing the efficiency of the agricultural operation (e.g., tillage operation). Additionally or alternatively, with regard to the second portion of the orientation controllable ground-engaging tool(s) that are within the no-work zone, the controller 170 may selectively adjust the respective target angle of each orientation controllable ground-engaging tool that is within the no-work zone (e.g., before disabling automatic orientation control). For example, in certain embodiments, the controller may set the respective target angle of each orientation controllable ground-engaging tool to zero degrees relative to the direction of travel 28. Setting the respective target angle to zero degrees for each orientation controllable ground-engaging tool that is within the no-work zone may substantially reduce soil disturbance and/or reduce the draft load on the work vehicle. Once an orientation controllable ground-engaging tool exits the no-work zone and enters the work zone, the controller 170 may selectively enable automatic orientation control for the orientation controllable ground-engaging tool. In addition, if the respective target angle was adjusted, the controller 170 may reset the respective target angle to the initial value.

While controlling the angle, the penetration depth, and the force of the disc blade(s), controlling the penetration depth and the force of the tillage point assembly/assemblies, and controlling the angle, the penetration depth, and the force of the finishing disc(s) is disclosed above, the control system disclosed herein may control only a portion of these parameters. For example, in certain embodiments, at least one of the angle, the penetration depth, or the force of the disc blade(s) may not be controlled/controllable, at least one of the penetration depth or the force of the tillage point assembly/assemblies may not be controlled/controllable, at least one of the angle, the penetration depth, or the force of the finishing disc(s) may not be controlled/controllable, or a combination thereof. Furthermore, in certain embodiments, other suitable parameter(s) may be controlled, such as the angle of the tillage point assembly/assemblies, a force applied by finishing reel(s) (e.g., in embodiments in which the tillage implement includes finishing reel(s)), a penetration depth of finishing reel(s) (e.g., in embodiments in which the tillage implement includes finishing reel(s)), other suitable parameter(s), or a combination thereof. In addition, the structure of the tillage implement may be different than the structure disclosed above. For example, the disc blade frame(s) may be omitted, and/or the tillage implement may include one or more wings pivotally coupled to the implement frame. In embodiments in which the tillage implement includes wing(s), the force applied by the controllable ground-engaging tool(s) and/or the penetration depth of the controllable ground-engaging tool(s) of each wing may be controlled by an actuator extending between the wing and the implement frame. Furthermore, while towable agricultural implements are disclosed herein (e.g., with reference to the embodiments of FIGS. 1-4), in certain embodiments, the agricultural implement may be self-propelled.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for a plurality of row units of an agricultural implement, comprising:
a controller comprising a memory and a processor, wherein the controller is configured to:
determine whether each row unit of the plurality of row units is within a work zone of an agricultural field or within a no-work zone of the agricultural field;
selectively enable automatic downforce control for at least one controllable ground-engaging tool of each row unit of the plurality of row units that is within the work zone of the agricultural field, wherein the automatic downforce control for the at least one controllable ground-engaging tool comprises controlling a first downforce of the at least one controllable ground-engaging tool independently of a second downforce applied by a non-controllable ground-engaging tool of the row unit such that the first downforce is within a threshold range of a respective target downforce; and
selectively disable the automatic downforce control for the at least one controllable ground-engaging tool of each row unit of the plurality of row units that is within the no-work zone of the agricultural field, or selectively adjust the respective target downforce for the at least one controllable ground-engaging tool of each row unit of the plurality of row units that is within the no-work zone of the agricultural field.

2. The control system of claim 1, wherein the at least one controllable ground-engaging tool of at least one row unit of the plurality of row units comprises one or more closing discs, and the automatic downforce control for the one or more closing disc comprises controlling an actuator extending between a frame of the at least one row unit and a closing assembly having the one or more closing discs to control the first downforce of the one or more closing discs.

3. The control system of claim 1, wherein the at least one controllable ground-engaging tool of at least one row unit of the plurality of row units comprises a packer wheel, and the automatic downforce control for the packer wheel comprises controlling an actuator extending between a frame of the at least one row unit and a packing assembly having the packer wheel to control the first downforce of the packer wheel.

4. The control system of claim 1, wherein the at least one controllable ground-engaging tool of at least one row unit of the plurality of row units comprises one or more residue management wheels, and the automatic downforce control for the one or more residue management wheels comprises controlling an actuator extending between a frame of the at least one row unit and a residue management assembly having the one or more residue management wheels to control the first downforce of the one or more residue management wheels.

5. The control system of claim 1, wherein the no-work zone comprises a first portion of the agricultural field in which agricultural operations have previously been performed, a second portion of the agricultural field in which the agricultural operations are not to be performed, or a combination thereof.

6. The control system of claim 1, wherein the at least one non-controllable ground-engaging tool of at least one row unit comprises one or more gauge wheels configured to control one or more respective penetration depths of one or more respective opener discs.

7. The control system of claim 6, wherein the controller is configured to:
selectively enable automatic penetration depth control for the one or more opener discs of each row unit of the plurality of row units that is within the work zone of the agricultural field, wherein the automatic penetration depth control for the one or more opener discs comprises controlling a position of each gauge wheel of the one or more gauge wheels relative to a respective opener disc of the one or more opener discs such that the respective penetration depth of the respective opener disc is within a threshold range of a respective target penetration depth; and
selectively disable automatic penetration depth control for the one or more opener discs of each row unit of the plurality of row units that is within the no-work zone of the agricultural field, or set the respective target penetration depth for each opener disc of the one or more opener discs of each row unit of the plurality of row units that is within the no-work zone of the agricultural field to a minimum penetration depth.

8. A control system for a plurality of controllable ground-engaging tools of an agricultural implement, comprising:
a controller comprising a memory and a processor, wherein the controller is configured to:
determine whether each controllable ground-engaging tool of the plurality of controllable ground engaging tools is within a work zone of an agricultural field or within a no-work zone of the agricultural field;
selectively enable automatic penetration depth control for each controllable ground-engaging tool of the plurality of controllable ground-engaging tools that is within the work zone of the agricultural field, wherein the automatic penetration depth control for each controllable ground-engaging tool of the plurality of controllable ground-engaging tools comprises controlling a penetration depth of the controllable ground-engaging tool such that the penetration depth is within a threshold range of a respective target penetration depth; and
selectively disable the automatic penetration depth control for each controllable ground-engaging tool of the plurality of ground-engaging tools that is within the no-work zone of the agricultural field without extracting the controllable ground-engaging tool from soil, or set the respective target penetration depth for each controllable ground-engaging tool of the plurality of ground-engaging tools that is within the no-work zone of the agricultural field to a minimum penetration depth, wherein the minimum penetration depth is greater than 0 cm below a surface of the soil.

9. The control system of claim 8, wherein the no-work zone comprises a first portion of the agricultural field in which agricultural operations have previously been performed, a second portion of the agricultural field in which the agricultural operations are not to be performed, or a combination thereof.

10. The control system of claim 8, wherein the plurality of controllable ground-engaging tools comprises one or more opener discs, and the automatic penetration depth control for each opener disc of the one or more opener discs comprises controlling a position of a respective gauge wheel relative to the opener disc to control the penetration depth of the opener disc.

11. The control system of claim 8, wherein the plurality of controllable ground-engaging tools comprises one or more openers, each opener of the one or more openers comprises a shank and a blade coupled to the shank, and the automatic penetration depth control for each opener of the one or more openers comprises controlling a position of a respective packer wheel relative to the opener to control the penetration depth of the opener.

12. The control system of claim 8, wherein the plurality of controllable ground-engaging tools comprises one or more tillage tools.

13. The control system of claim 12, wherein the one or more tillage tools comprises a disc blade, a tillage point assembly, a finishing disc, or a combination thereof.

14. The control system of claim 8, wherein the controller is configured to:
set the respective target penetration depth for each controllable ground-engaging tool of the plurality of ground-engaging tools that is within the no-work zone of the agricultural field to the minimum penetration depth; and
selectively disable automatic penetration depth control for each controllable ground-engaging tool of the plurality of ground-engaging tools that is within the no-work zone of the agricultural field without extracting the controllable ground-engaging tool from the soil in response to the penetration depth of the controllable ground-engaging tool being within the threshold range of the respective target penetration depth.

15. A control system for a plurality of controllable ground-engaging tools of a tillage implement, comprising:
a controller comprising a memory and a processor, wherein the controller is configured to:
determine whether each controllable ground-engaging tool of the plurality of controllable ground engaging tools is within a work zone of an agricultural field or within a no-work zone of the agricultural field;
selectively enable automatic control of one or more parameters of each controllable ground-engaging tool of the plurality of controllable ground-engaging tools that is within the work zone of the agricultural field, wherein the automatic control of the one or more parameters of the controllable ground-engaging tool comprises controlling the one or more parameters of the controllable ground-engaging tool such that each of the one or more parameters is within a respective range of a respective target parameter; and
selectively disable the automatic control of at least one of the one or more parameters of each controllable ground-engaging tool of the plurality of controllable ground-engaging tools that is within the no-work zone of the agricultural field, selectively adjust at least one of the one or more parameters of each controllable ground-engaging tool of the plurality of controllable ground-engaging tools that is within the no-work zone of the agricultural field, or a combination thereof;
wherein the plurality of controllable ground-engaging tools comprises one or more disc blades, one or more tillage point assemblies, one or more finishing discs, or a combination thereof.

16. The control system of claim 15, wherein the plurality of controllable ground-engaging tools comprises one or more disc blades; and
wherein the one or more parameters of each disc blade of the one or more disc blades comprises an angle of the disc blade relative to a direction of travel of the tillage implement, a penetration depth of the disc blade, a force applied by the disc blade to soil, or a combination thereof.

17. The control system of claim 15, wherein the plurality of controllable ground-engaging tools comprises one or more tillage point assemblies; and wherein the one or more parameters of each tillage point assembly of the one or more tillage point assemblies comprises a penetration depth of the tillage point assembly, a force applied by the tillage point assembly to soil, or a combination thereof.

18. The control system of claim 15, wherein the plurality of controllable ground-engaging tools comprises one or more finishing discs; and wherein the one or more parameters of each finishing disc of the one or more finishing discs comprises an angle of the finishing disc relative to a direction of travel of the tillage implement, a penetration depth of the finishing disc, a force applied by the finishing disc to soil, or a combination thereof.

19. The control system of claim 15, wherein the no-work zone comprises a first portion of the agricultural field in which agricultural operations have previously been performed, a second portion of the agricultural field in which the agricultural operations are not to be performed, or a combination thereof.

20. The control system of claim 15, wherein the one or more parameters of each controllable ground-engaging tool of the plurality of controllable ground-engaging tools comprises an angle of the controllable ground-engaging tool relative to a direction of travel of the tillage implement, a penetration depth of the controllable ground-engaging tool, a force applied by the controllable ground-engaging tool to soil, or a combination thereof.

* * * * *